(No Model.)
I. M. SCOTT.
HOISTING GEAR INDICATOR.
No. 245,749. Patented Aug. 16, 1881.
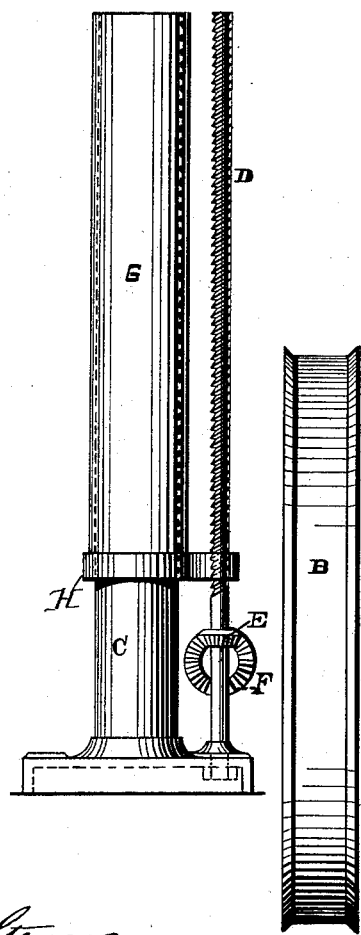
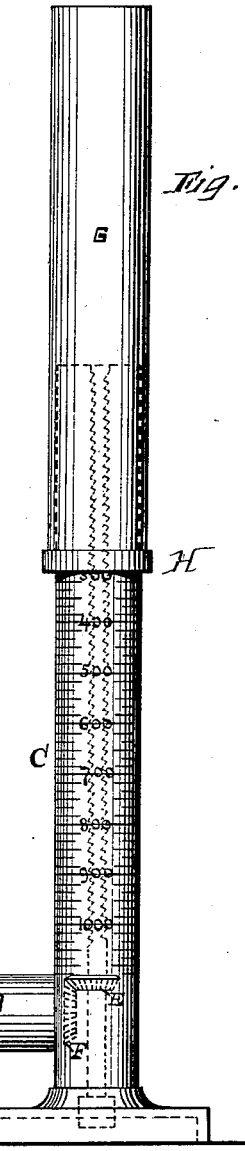
Witnesses
Geo. H. Strong.
Frank A. Brooks
Inventor
Irving M. Scott
By Dewey & Co.
Attys

UNITED STATES PATENT OFFICE.

IRVING M. SCOTT, OF SAN FRANCISCO, CALIFORNIA.

HOISTING-GEAR INDICATOR.

SPECIFICATION forming part of Letters Patent No. 245,749, dated August 16, 1881.

Application filed May 19, 1881. (No model.)

*To all whom it may concern:*

Be it known that I, IRVING M. SCOTT, of the city and county of San Francisco, State of California, have invented an Improved Hoisting-Gear Indicator; and I hereby declare the following to be a full, clear, and exact description thereof.

My invention relates to that class of indicators which are used upon hoisting-engines for the purpose of indicating the position of the object hoisted. The use which will best exemplify its object is its application to the hoisting-engines of mining machinery, in which it is desirable for the engineer to know exactly at what point in the shaft of the mine the cage or whatever object he may be hoisting is at the moment. Where the shaft is deep he cannot see the cage, and consequently must have its position indicated to him in some reliable and accurate manner. He will thus be enabled to stop the cage at any desired point, and if his indicator is accurate he may avert accidents which frequently occur.

My invention has for its object not only the indicating with accuracy of the position of the cage, but further accomplishes the important object of presenting to the sight of the engineer its indication in such a palpable manner as will convey to his mind instantly and without any confusion the requisite knowledge. In the course of the following specification these points will be fully set forth.

Referring to the accompanying drawings, Figures 1 and 2 are views of my invention.

Let A represent the main shaft of the hoisting-engine, and B the drum or reel on which the wire rope or cable attached to the cage is wound.

C represents a vertical post or pillar, supported on the foundation near the reel B. Upon this pillar are marked in plain characters the proper figures indicating the various levels and other intermediate points in the shaft, as may be desired. These figures may be placed to represent stations or feet, their positions being determined by the accuracy and minuteness of each case, and such other marks and lines may be put thereon as will represent with still greater accuracy certain distances in the shaft.

Beside the vertical pillar C is the vertical screw D, journa'ed or pivoted in the foundation, and supported and pivoted above in any appropriate manner.

A bevel-gear, E, is carried upon the lower part of the vertical screw D, which meshes with a gear, F, upon the end of the driving-shaft A. The vertical screw D is thus revolved.

G represents a cap or covering fitting down over the indicating-post C, and when fully down completely shutting out from sight all the marks and figures on said post. The base of the cap or inclosing-tube G is provided with a flange, H, extending outwardly, and having a hole through it provided with screw-threads, through which hole the vertical screw D is fitted and passes. Thus when the screw D is revolved the whole cap G is raised or lowered over the indicating-post A.

The driving mechanisms of the bevel-gears and the vertical screw are so adjusted as to capacity and size as to be in accord with the winding-drum and the distance in the shaft and their representative figures on the post A. This correspondence, being a matter of calculation, is obvious. If the cage is at the bottom of a shaft one thousand feet deep, as it is hoisted the cap G is raised, and when the cage reaches the nine-hundred-foot level the base of the cap G will have just uncovered the figures 900, representing that level. By casting the eye at the base of the cap the proper indication can be observed instantly, without confusion, because some of the figures are always covered, except at the very top. It is easier for the eye to catch the broad base of the cap G than a small pointer operating over a visible surface. Cast the eye always as high as any figures are to be seen and the proper indication will be instantly observed. The necessity of instant observation is well known. By it the cage may be stopped with accuracy and no time be lost.

It is obvious that I may vary the precise mechanism here shown to raise the cap. I may connect the gearing with the driving-shaft, either directly, as here shown, or indirectly by intermediate connection. Such change will not affect the invention, the main point being the inclosing or covering sliding cap G for the purpose described.

I am aware that devices for indicating the position of cages in shafts have been heretofore used, and that they have been run from, and made to depend upon the revolution of, the winding-drum.

I do not therefore claim, broadly, the principle covered by such previous use; but What I do claim as new, and desire to secure by Letters Patent, is—

1. In combination with the cable reel or drum B, the marked indicating-post C and inclosing-tube G, having a flange, H, said inclosing-tube G being adapted to move over the surface of the said post C by means of the bevel-gears E and F and revolving screw D, substantially as herein described.

2. In combination with the marked indicating-post C, the sliding inclosing-tube G, having a flange, H, and operated by the screw D, bevel-gears E and F, and main shaft A, substantially as and for the purpose herein described.

In witness whereof I have hereunto set my hand.

IRVING M. SCOTT.

Witnesses:
J. H. BLOOD,
C. D. COLE.